United States Patent
Borkovsky et al.

[15] 3,675,194
[45] July 4, 1972

[54] SEISMIC PROSPECTING STATION

[72] Inventors: Gennady Mikhailovich Borkovsky, Khoroshevskoe shasse, 16, kv. 11; Vitaly Borisovich Tsukernik, Chisty pereulok 5a, kv. 27; Irina Nikolaevna Ierusalimskaya, Khoroshevskoe shasse, 16, kv. 11, all of Moscow, U.S.S.R.

[22] Filed: Feb. 3, 1971

[21] Appl. No.: 112,398

Related U.S. Application Data

[63] Continuation of Ser. No. 796,328, Feb. 4, 1969, abandoned.

[52] U.S. Cl. ............................................................340/15.5 DP
[51] Int. Cl. ..............................................................G01v 1/22
[58] Field of Search ...........................................340/15.5 DP

[56] References Cited

UNITED STATES PATENTS

| 3,241,100 | 3/1966 | Loafbourrow | 340/15.5 DP |
| 3,376,557 | 4/1968 | Godinbz | 340/172.5 |

Primary Examiner—Benjamin A. Borchelt
Assistant Examiner—N. Moskowitz

[57] ABSTRACT

A seismic prospecting station with digital recording of the received seismic signals having a common amplifier system which provides for logging of the information of the seismic prospecting data within a wide dynamic range.

1 Claim, 1 Drawing Figure

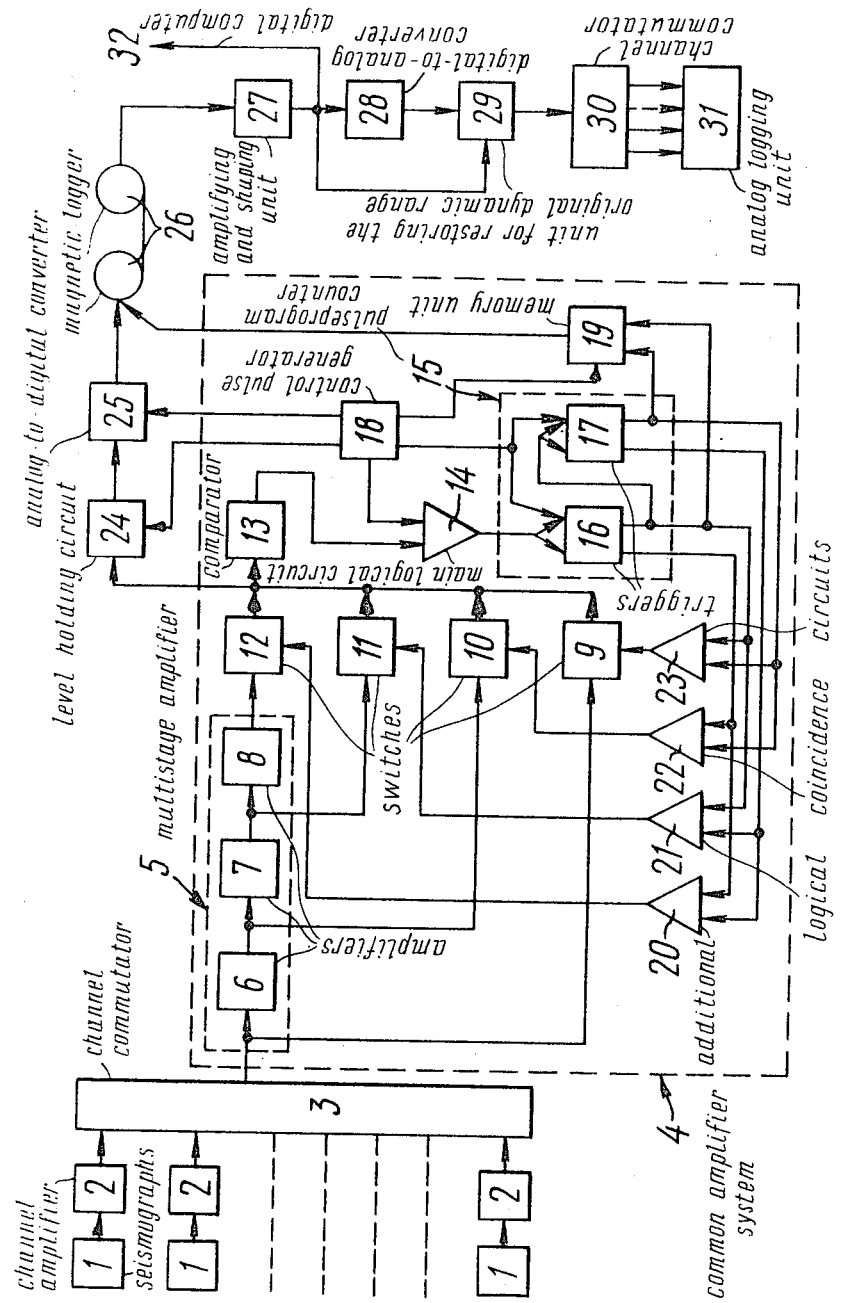

SEISMIC PROSPECTING STATION

This application is a continuation of Ser. No. 796,328, filed Feb. 4, 1969, now abandoned.

The present invention relates to apparatus for geophysical prospecting and, more particularly, has reference to seismic prospecting stations with digital recording of the seismic prospecting data obtained through the use of the reflected-wave method, the refracted-wave method and with the help of seismic depth sounding.

Known in the art are seismic prospecting stations with digital recording of the seismic signals received by seismographs and applied through channel amplifiers and a channel commutator to the input of a common amplifier system. One output of the common amplitude system is connected through a level holding circuit to an analog-to-digital converter associated with a magnetic logger for recording the coded information and the other output of which is directly connected to a magnetic logger for recording the coded pulses of the law of amplification. The term "law of amplification" as utilized hereinbelow more specifically refers to a gain code or amplification code and should be construed as such.

In these stations the common amplifier system comprises a multistage amplifier with outputs from each stage, comparators and switches, the number of which corresponds to that of the amplifying stages, and a device for shaping coded pulses of the law of amplification.

The above-mentioned stations are disadvantageous in that the common amplifier system employed therein is very complicated since it must be provided with complex-circuit comparators the number of which is equal to the number of amplifying stages.

The basic object of the invention is to provide a seismic prospecting station, simple in construction and reliable in operation, with digital recording of the seismic signals which will ensure logging the information concerning the data of the seismic prospecting within a wide dynamic range exceeding the dynamic range of the analog-to-digital converter used therein.

This object is achieved by providing a seismic prospecting station with digital recording of the signals received by the seismographs and fed through channel amplifiers and a channel commutator to the input of a common amplifier system which, depending upon the amplitude of the input signal, performs automatic variation of the scale of a signal supplied to the input of the analog-to-digital converter and which thereby shapes special program pulses of the amplification law, which indicate in what scale the signal amplitude was supplied to the analog-to-digital converter, i.e. from what amplifying stage the information was read out, one output of which is connected through a level holding circuit to an analog-to-digital converter associated with a magnetic logger for recording the coded information, while the other output of the system is directly connected to a magnetic logger for recording the coded pulses of the law of amplification. According to the invention, the common amplifier system of the station comprises a multistage amplifier with outputs from each stage connected with a channel commutator and having its outputs connected to the inputs of switches having a common output circuit and being connected to the inputs of the level holding circuit and a comparator whose output is connected to one of the outputs of the main logical coincidence circuit, a program pulse counter connected to the output of the main logical coincidence circuit, and additional logical coincidence circuits whose number is equal to that of the switches connected to the control inputs of said switches, thereby the program pulse counter is additionally connected to a memory unit connected to a magnetic recorder and to a control pulse generator connected to the second input of the main logical coincidence circuit, memory unit, level holding circuit and analog-to-digital converter.

Owing to such a design the proposed station is the most portable, the most simple in construction and economical among all seismic prospecting stations known in the art.

Further objects and advantages of the present invention will become more readily apparent and the invention will be better understood by reference to the following description thereof taken in conjunction with the accompanying drawing in which is illustrated a block diagram of the station according to the invention.

The seismic prospecting station with digital recording of seismic signals, according to the invention, comprises seismographs 1 connected to channel amplifiers 2 which, in turn, are connected to a channel commutator 3. The output of the channel commutator 3 is connected to the input of a common amplifier system 4.

The common amplifier system 4 comprises multistage amplifier 5, said amplifier being connected with channel multiplexer 3 and having $n$-stages of amplification (in the embodiment described herein said amplifier has four stages of amplification, with the first stage of amplification being considered a buffer amplifier with amplification factor $K=2°$ through which combined inputs of switches of channel multiplexers are fed and which is considered a part of the channel multiplexer), said amplifier comprising amplifiers 6–8, the four amplifier stage outputs being connected to the inputs of switches 9–12 having a common output, i.e. their outputs being interconnected. The common output circuit of the switches 9 to 12 is connected to the input of a comparator 13 whose output is connected through a logical coincidence circuit 14 to a program pulse counter 15 based on flip-flops 16 and 17.

The zero inputs of the flip flops 16 and 17 are connected to one output of a control pulse generator 18, the other output of which being connected to the second input of the logical coincidence circuit 14. The zero outputs of the flip-flops 16 and 17 are connected to the input of a memory unit 19 connected with the control pulse generator 18. The outputs of the flip-flops 16 and 17 are connected to the inputs of additional logical coincidence circuits 20 to 23 whose outputs are connected to the control inputs of the switches 9 to 12. The number of the circuits 20 to 23 is equal to that of the switches 9 to 12.

The common output circuit of the switches 9 to 12 is connected through a level holding circuit 24 and an analog-to-digital converter 25 associated with the control pulse generator 18 to the heads of a magnetic logger 26 for recording the coded information. The memory unit 19 is connected to the heads of the magnetic logger 26 for recording the coded pulses of the law of amplification.

The magnetic logger 26 is connected to unit 27 for amplifying and shaping the sampled digital information which, in turn, is connected to a digital-to-analog converter 28 associated with a unit 29 for restoring the original dynamic range, the other input of the unit 29 being connected to the unit 27. The unit 29 through a channel commutator 30 is connected to an analog logging unit 31.

The station provided by the invention operates as follows.

The signals received by the seismographs 1 are amplified by the channel amplifiers 2 and fed to the inputs of the channel commutator 3 providing for switching low-level signals. The channel commutator 3 effects alternate cyclic connection of the outputs of the amplifiers 2 to the input of the common amplifier system 4 which provides for transmission of the received signal to the input of the level holding circuit 24 in such a scale that the signal is transmitted with a sufficient accuracy and with programmed-scale coded pulses (coded pulses of the law of amplification) which make it possible to subsequently restore the true shape of the signal.

From the output of the level holding circuit 24 in which the amplitude level of the received signal is stored in the form of an invariable quantity during the time needed for conversion of this signal, the signal is impressed upon the input of the analog-to-digital converter 25, from the output of which the information in the form of a parallel binary pulse code is recorded on the magnetic carrier of the magnetic logger 26, thereto, simultaneously with the recording of the number code, are applied the scale pulses from the second output of the amplifier system 4. During the playback, the binary number code amplified and shaped by the unit 27 and auxiliary pulses are applied to the input of the digital-to-analog converter 28 shaping an amplitude-pulse analog signal impressed on the input 29 for restoring the original dynamic range, the other input of which being fed with the program scale pulses of the unit 27. The restored true shape of the signal reduced in unit 29 to one scale and represented within the full dynamic range is fed through the channel commutator 30 operating simultaneously with the channel commutator 3 to the analog logging unit 31.

During the playback, the binary number code amplified and shaped by the unit 27, the program and auxiliary pulses may be also applied to input devices of a digital computer 32.

The principle of operation of the functional circuit of the common amplifier system 4 (system with an instantaneous servo-type gain control) based on the operating principle of a feedback system is as follows: the exemplary embodiment as described above is a version with four amplifying stages wherein the first stage having an amplification factor $K=2^0$ is omitted and the connection time of one channel to the system is 30 $\mu$sec. and the amplification factor for each stage is two.

The signal from the output of the channel commutator 3 is applied to the input of the amplifiers 6 to 8, each amplifying stage having a fixed value of amplification equal to $2^n$ (where $n$ are whole numbers). The outputs of these amplifiers through the switches 9 to 12 are fed to the input of the comparator 13. The signal taken directly from the input of the common amplifier system 4 is applied to the input of the comparator 13 through the switch 9 of common amplifier system 4, whereby the signal in question is considered to be taken from the first amplifying stage with the amplification factor $K=2^0$.

In the initial state, prior to connecting one of the channel amplifiers 2 to the input of the system 4 by the channel commutator 3, there are no signals at the output of the comparator 13 connected to the input of the main logical coincidence circuit 14.

In this case the program counter 15 is at the initial state whereby coincidence is provided across the output of the additional logical coincidence circuit 20. When the signal of one of the channels fed from the output of the channel commutator 3 is applied to the input of the system 4, this signal, being amplified by the amplifiers 6–8, through the closed switch 12 is impressed on the input of the commutator 13 and, if it exceeds the reference voltages in the comparator 13 by maximum or minimum, a potential appears at the output of the comparator which is applied to the coincidence circuit 14.

5 musec after the connection of one of the channels effected by the commutator 3, the control pulse generator 18 transmits a first gate pulse to the input of the logical coincidence circuit 14. Due to the coincidence of the gate pulse with the potential from the output of the comparator 13, the program pulse counter 15 is transferred for one unit by the triggering input.

In this case there is no coincidence in the circuit 20, the switch 12 closes, there is coincidence in the circuit 21 and the switch 21 closes so that a signal passes through it from the output of the amplifier 7, i.e. the signal attenuated by a factor of $2^3$ as compared with the signal at the output of the amplifier 8. If this signal again exceeds the reference voltages in the comparator 13, a potential remains at the output thereof, while in the circuit 14 coincidence takes place with the next gate pulse following the first one at a 5-musec interval, and the counter 15 is put on the next position corresponding to the count "two".

While this is taking place, the switch 11 opens and the switch 10 closes by means of the coincidence circuit 22, the latter switch transmitting a signal, attenuated once again by a factor of $2^3$, from the output of the amplifier 6 to the input of the comparator 13.

Let us assume that in this case the signal will be less than the reference voltages, then the potential at the output of the comparator 13 will disappear and the third gate pulse following at a 5-musec interval after the second pulse will not cause an inversion of the pulse counter 15, and, therefore, the system will remain in the same state. 5 musec after the last (in this case the third) gate pulse the level holding circuit 24 is allowed to sample the signals from the common output of the switches 9 to 12. The signal is stored in the level holding circuit 24 and applied to the analog-to-digital converter 25 which converts the received signal sample into a binary code.

After the sampling the control pulse generator 18 produces a signal for resetting the pulse counter 15. During this reset, which in this case corresponds to the code 2[10], the code of the law of amplification is transferred to the memory unit 19 in which it is stored.

At this stage the cycle of operation of the common amplifier system 4 is ceased, thereafter, the following seismic signal is fed to the amplifier 6 through the channel commutator 3, and the process of the choice of amplification is repeated, as described above, being ceased each time the signal appears to be less than the reference voltages, i.e. remaining in the same position in which the next switch, passing this signal, is closed.

By the time of taking the next sample of the signal, the coding of the preceding value of the signal, its counting and recording in the magnetic logger 26 are completed. At the same time the counting and recording of the code of the law of amplification of this signal, stored in the memory unit 19, and the erasing of the memory circuit are carried out.

Thus, the number code and the code of the law of amplification are recorded on a magnetic carrier, in this particular case the code of the law of amplification 2 [10] is recorded. This means that during the playback operation for restoring the true shape of the signal or during entering the data into a digital computer, the number code should be multiplied by $2^3 \times 2^3$ and this means the 2×3-position left shift, i.e. here we are concerned with a floating-point number code.

The seismic prospecting station of the present invention provides for high-quality logging of information in a digital form by recording this information on a magnetic carrier of a magnetic logger with practically unlimited input dynamic range.

The principle of operation of this station precludes the possibility of overloading, choice of incorrect amplification so that it is very simple in service and this fact considerably reduces the operational cost.

The system for recording the digital information with a wide input dynamic range, having been resorted to in the present station, is the most simple and economical and also is convenient for entering information into a digital computer.

What is claimed is:

1. A seismic prospecting system with digital recording of seismic signals, said system comprising:

a plurality of seismometers for detecting seismic signals;

a plurality of channel amplifier means respectively coupled to said seismometers;

a channel multiplexer means having a plurality of inputs respectively connected to said channel amplifier means, and having an output, said multiplexer means alternately and cyclically coupling each input to said output;

a common multistage amplifier means having a plurality of amplification stages including a zero amplification stage, said amplifier means having an input connected through said zero amplification stage thereof to said multiplexer output, each amplification stage having a separate output;

a plurality of controllable switch means, each switch means having an input respectively connected to an output of different amplification stages of said multistage amplifier means, a control input, and an output connected in common;

a level holding circuit means for controlling and storing the amplitude level of input signals thereto, said level holding circuit having first and second inputs, and an output, said first input being connected to said common output of said switch means;

a comparator means for comparing the value of input signals thereto with a reference, said comparator means having an input connected to said common output of said switch means, and an output;

control pulse generating means for generating pulses, said generating means having five outputs, the first output thereof being connected to said second input of said level holding circuit means, the second output of which generates a series of $m$ pulses, wherein $m$ is the number of amplifying stages of said amplifier means minus 1;

a main logical coincidence circuit means having two inputs and an output, one input being connected to said output of said comparator means, the other input of which is connected to said second output of said control pulse generating means;

a program pulse counter for counting input pulses thereto fed from said main logical coincidence circuit means, said pulse counter having one input coupled with said output of said main logical coincidence circuit means and another input coupled with a third output of said control pulse generating means, and outputs;

a plurality of additional logical coincidence circuits equal to the number of switch means, said additional logical coincidence circuits having inputs coupled to selected outputs of said program pulse counter and having outputs respectively connected to said control inputs of said switch means to sequentially and selectively operate said switch means coupling various ones of said amplification stage outputs to said common output of said switch means;

a memory unit for storing the value of input signals thereto, said memory unit having inputs connected to outputs of said program pulse counter and to a fourth output of said control pulse generating means, and an output;

an analog-to-digital converter means having one input connected to said output of said level holding circuit means, another input connected to the fifth output of said control pulse generating means, and an output;

magnetic recorder means having one input connected to said output of said analog-to-digital converter means for recording information, and another input connected to said output of said memory unit for recording code pulses representative of the amplification law of said amplifier means, said recorder means having an output; and decoder means connected to said output of said recorder means for decoding the data recorded by said magnetic recorder means.

* * * * *